(12) United States Patent
Spangenberg et al.

(10) Patent No.: US 8,964,344 B2
(45) Date of Patent: Feb. 24, 2015

(54) CIRCUIT BREAKER SIGNALING SYSTEM FOR CONTROL OF AN ARC FAULT DETECTION SYSTEM

(75) Inventors: Richard Gerhard Spangenberg, Raleigh, NC (US); Julius Michael Liptak, Knightdale, NC (US)

(73) Assignee: Schneider Electric USA, Inc., Palatine, IL (US)

(*) Notice: Subject to any disclaimer, the term of this patent is extended or adjusted under 35 U.S.C. 154(b) by 0 days.

(21) Appl. No.: 13/593,730

(22) Filed: Aug. 24, 2012

(65) Prior Publication Data

US 2014/0055886 A1   Feb. 27, 2014

(51) Int. Cl.
*H02H 3/00* (2006.01)
*H02H 7/00* (2006.01)

(52) U.S. Cl.
USPC ................................. 361/62; 361/8

(58) Field of Classification Search
USPC .................. 361/2–13, 62–68, 115, 42, 54, 81
See application file for complete search history.

(56) References Cited

U.S. PATENT DOCUMENTS

| | | | | |
|---|---|---|---|---|
| 5,064,998 A * | 11/1991 | Holling | ................. | 219/519 |
| 5,307,077 A * | 4/1994 | Branigan et al. | ................. | 343/720 |
| 5,933,308 A | 8/1999 | Garzon | | |
| 7,499,251 B2 * | 3/2009 | Byron | ................. | 361/42 |
| 8,503,137 B2 * | 8/2013 | Panetta | ................. | 361/10 |
| 2006/0164097 A1 | 7/2006 | Zhou et al. | | |
| 2008/0225445 A1 * | 9/2008 | Cheng et al. | ................. | 361/2 |
| 2011/0299200 A1 * | 12/2011 | Yanniello | ................. | 361/42 |
| 2012/0119751 A1 | 5/2012 | Scott et al. | | |
| 2014/0043714 A1 * | 2/2014 | Benke | ................. | 361/42 |

OTHER PUBLICATIONS

International Search Report for International Application No. PCT/US2013/051189—Date of Completion of Search: Oct. 4, 2013—5 pages.
PCT Written Opinion for International Application No. PCT/US2013/051189—Date of Completion of Opinion: Oct. 4, 2013—7 pages.
Kumpulainen, Lauri, et al., "High Speed Protection Concept to Minimize the Impacts of Arc-Flash Incidents in Electrical Systems of Ships", Electric Ship Technologies Symposium, Apr. 10, 2011, pp. 228-233.

* cited by examiner

*Primary Examiner* — Thienvu Tran
*Assistant Examiner* — Christopher Clark
(74) *Attorney, Agent, or Firm* — Locke Lord LLP

(57) ABSTRACT

In an electrical distribution system an arc management system has a transducer mounted in proximity to the circuit breaker for detecting and signaling a secondary effect of an overcurrent event within the case of the circuit breaker. The transducer provides an additional input to an arc fault detection system using other detectors and thus helps to control nuisance activations of the arc extinguishing mechanism. The system is particularly suited for circuit breakers without electronics, or the like, allowing for retrofit of existing systems. The system may monitor and act upon the excessive duration of the secondary effects.

15 Claims, 3 Drawing Sheets

CIRCUIT BREAKER SIGNALING SYSTEM FOR CONTROL OF AN ARC FAULT DETECTION SYSTEM

BACKGROUND OF THE INVENTION

1. Field of the Invention

The present invention relates generally to electrical distribution equipment and conductors. The invention relates more particularly to controlling the misdetection of arc faults by arc fault detection systems in electrical systems.

2. Discussion of the Known Art

Switchgear enclosures are commonly employed in electrical power distribution systems for enclosing circuit interrupters and switching equipment associated with the distribution system. Typically, switchgear enclosures are comprised of a number of individual stacked or adjacent compartments, each of the switchgear compartments receiving electrical power from a power source and distributing the electrical power through a feeder circuit to one or more loads. Generally, each of the switchgear compartments includes circuit breakers or other interrupters for breaking electric power in a particular feeder circuit in response to hazardous current overloads in the circuit, or normal switching events.

In addition to current overloads, the switchgear enclosure may encounter other hazardous conditions known as arcing faults. Arcing faults occur when electric current "arcs" or flows through ionized gas between conductors, e.g., between two ends of broken or damaged conductors, or between a conductor and ground in the switchgear enclosure. These arcs are to be distinguished from the hot luminous gas exhaust that which occurs from the circuit breakers themselves upon separation of the breaker contacts and is a byproduct of intended breaker operation. Arcing faults typically result from corroded, worn or aged wiring or insulation, loose connections and electrical stress caused by repeated overloading, lightning strikes, etc. Particularly in medium- to high-voltage power distribution systems, the ionized gas associated with arcing faults may be released at pressures and temperatures sufficient to severely damage or destroy the switchgear equipment and/or cause severe burning injuries or death to operating personnel.

Switchgear enclosures can provide arc-resistant metal switchgear compartments, often with a means for venting the gases from the compartments in the event of an arcing fault. These compartments are designed to withstand the pressures and temperatures of the gases associated with an arcing fault and reduce the likelihood or extent of damage to switchgear equipment by preventing the gases from entering adjacent switchgear compartments. Safety to operating personnel is enhanced by channeling and venting the hot gases away from operating personnel. However, because these systems do not eliminate the generation and release of hot gases associated with arcing faults, they do not completely eliminate the risk of injury to operating personnel and/or damage to the switchgear equipment.

Both passive and active arc control means are known in the art. Passive means include directed venting of the arc blast energy and gasses out of the cabinet. Other passive means may include reinforcement of the cabinet structure in an effort to withstand the blast. Limiting arc fault duration through active systems is particularly important in limiting potential damage from the blast. Active means usually include some form of sensing and a switching mechanism to control the current. Of course, the quicker the arc is sensed and controlled the less harm is likely to be done by the arcing event.

One method employed for enhancing the safety and durability of switchgear enclosures in the event of arcing faults, as described in U.S. Pat. No. 5,933,308 to Garzon, is to provide arc-resistant metal switchgear compartments with a means for grounding or shunting the source bus current in the event of an arcing fault condition. This is done in Garzon by monitoring the rise rate of the source or main bus current and monitoring the light produced by arcing events in each feeder compartment by optical sensors. The current and the optical signals are AND'ed together to produce an arcing fault detection signal which activates an arc diverter mechanism within the appropriate time frame. Other known arcing fault sensing circuits may use only optical detectors. Removal of the voltage sustaining the arc in known systems may be by operation of an arc extinguishing mechanism including the feeder breaker, an arc diverter mechanism, or both, which are responsive to the arc fault detection systems.

SUMMARY OF THE INVENTION

Operation of an arc extinguishing mechanism, such as operating an arc diverter device or opening of the equipment feeder breaker, or both, will cause complete interruption in operation of the equipment, and can be quite stressful to the equipment and electrical system. As such it is desirable to avoid any kind of nuisance operation. A quick, economical, mechanism for controlling and extinguishing arc events with a minimum of false activation would be welcome in the art. In known arc fault detection systems various current sensors and optical sensors may be used inside the cabinet to detect current anomalies and light flashes characteristic of an arcing event and trigger the extinguishing mechanism to remove all downstream voltage and prevent arc flashes.

However, in many instances where a short circuit event on a branch circuit external to the switchgear triggers the operation of a feeder line circuit breaker in the enclosure, the arc fault detection system could become confused by the light emanating from the circuit breaker during a ordinary breaker tripping event and initiate a false arc fault detection when the system should merely let the breaker trip and do its job rather than shutting down the system.

Thus it would be desirable to provide the arc fault detection system with a warning of an imminent breaker trip. However, a large installed base of breakers has no provision for such detection and warning within an arc fault detection system.

To that end, the present invention in its various aspects and embodiments teaches and provides an arc management system having a transducer mounted in proximity to the feeder line circuit breaker (hereinafter sometimes merely referred to for convenience as a "breaker"), preferably outside of the breaker case, for detecting and signaling a secondary effect of an overcurrent event within the case of the circuit breaker, with the transducer signaling a possible breaker tripping event to an arc fault detection system capable of receiving, processing, and acting on the transducer signal to prevent, limit, or control the initiation of, the arc extinguishing operations.

Other aspects of the invention may include a method of signaling for a circuit breaker within an arc fault detection system, comprising the steps of applying a transducer in proximity to the case of the circuit breaker, detecting a secondary effect of an overcurrent event occurring within the case of the circuit breaker with said transducer, transmitting a signal from the transducer upon detection of said secondary effect to an arc fault detection system, and receiving and processing said signal at the arc fault detection system as a filter on detection of a possible arc event. The transducer may be selected from a group of transducers including a magnetic sensor; a vibration sensor, as explained below; a radio frequency or near radio frequency (RF) sensor; and a thermal sensor.

The transducer in some aspects of the invention may be a magnetic sensor located on the exterior of the circuit breaker case in proximity to a current path of the circuit breaker to sense a rise in magnetic fields associated with a large rise in current through the circuit breaker. In other aspects the transducer may be a vibration sensor located on the exterior of the circuit breaker case in proximity to a point of maximal vibration caused by the movable contact or contacts of the circuit breaker separating to open the protected circuit. Thus it will be understand that in the context of the present disclosure "vibration" will include nonperiodic transitory shocks as may be generated by the opening of the breaker contacts. In other aspects the transducer may be an RF sensor located on the exterior of the circuit breaker case in proximity to a movable contact of the circuit breaker for sensing higher frequency electromagnetic radiation caused by arc formation on the parting contacts of the circuit breaker. In other aspects the transducer may be a thermal sensor located in proximity to a hot spot on the breaker case caused by rapid current rise or near an exhaust port of the circuit breaker which releases high temperature arc gases and debris to the outside of the circuit breaker case upon separation of the breaker contacts.

Upon output of the transducer signal, in some instances a step in the method of arc control may include using the signal as a filter input to eliminate falsely positive indications of an arcing event and prevent operation of an arc extinguisher system, i.e. arc diverter, main breaker or both, shutting down the entire electrical apparatus of a switchgear cabinet.

In some aspects of the invention sensing a secondary effect of the circuit breaker during overcurrent interruption also provides an indication of the duration of the interruption event to the arc flash detection system. Should the secondary effect not terminate in a prescribed time, the circuit breaker may have been unsuccessful in interrupting the current and may be at-risk of starting an arc flash event. With the knowledge of the event duration or continuing presence, the arc flash detection system can take corrective action by annunciating the condition, opening the main breaker, operating the arc diverter or adjusting the arc flash detection system programmed response to future sensory inputs.

Thus several advantages may be provided the arc management system with the most significant being the possibility to discriminate whether the triggering of an optical sensor was caused by light from an arc flash event or light from a circuit breaker overcurrent interruption event.

Some aspects of the invention may be particularly suited or adaptable for arc management around a molded case circuit breaker contained within an enclosed switch gear cabinet. The present invention provides for an output to arc fault detection system particularly efficacious for breakers where no such signaling means existed before, such as breakers without electronics, breakers not equipped with AFI or GFI sensors, current transformers (CTs) or the like, thus allowing for retrofit of such existing systems.

BRIEF DESCRIPTION OF THE DRAWINGS

The foregoing and other advantages of the present disclosure will become apparent upon reading the following detailed description and upon reference to the drawings of which.

DETAILED DESCRIPTION

Figure 1:
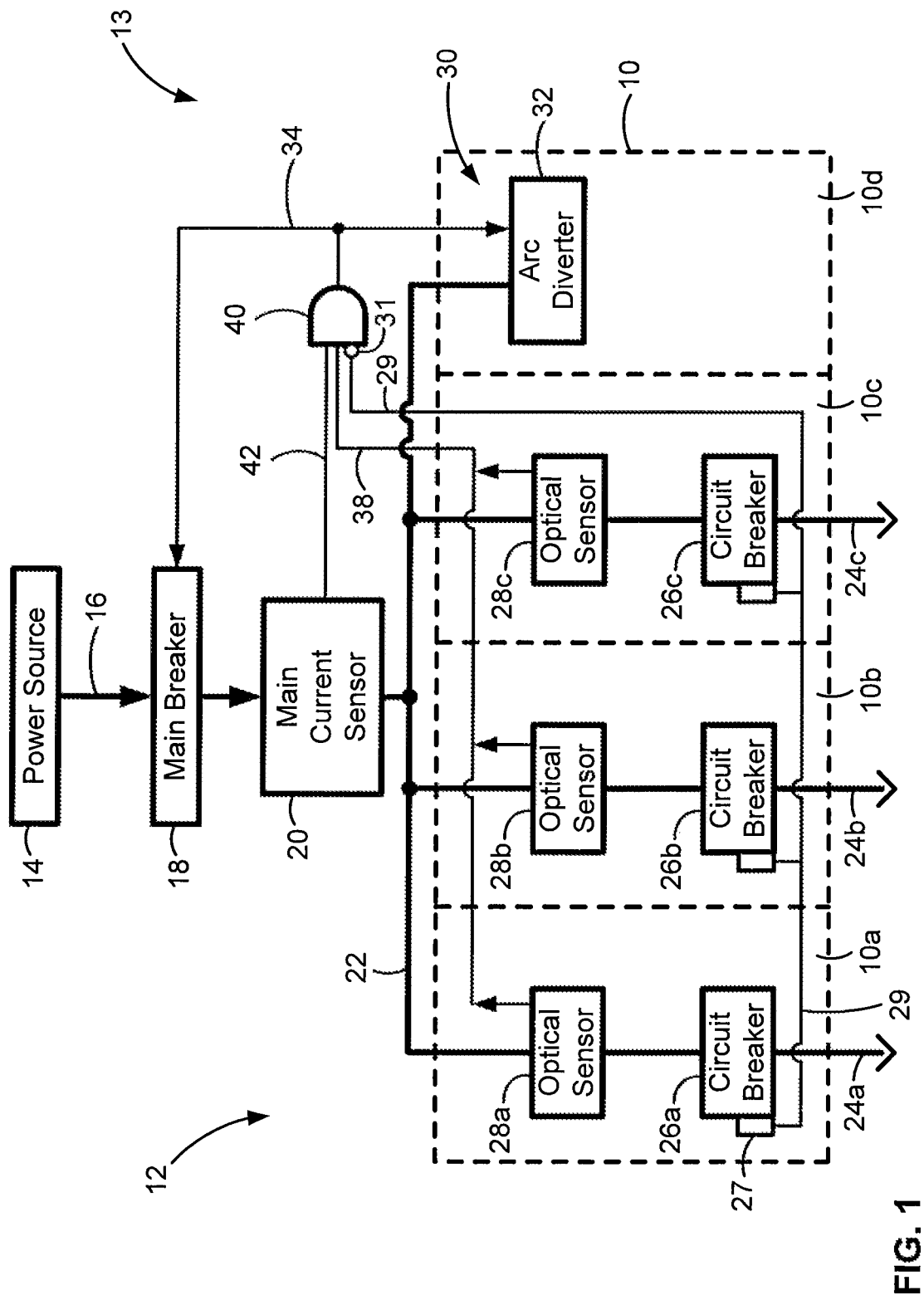
FIG. 1 is a block diagram of an arcing fault protection system for a switchgear enclosure according to one embodiment of the present invention.

Turning now to the drawings and referring first to FIG. 1, there is shown a switchgear enclosure, generally designated by reference numeral 10, including individual compartments 10a, 10b, 10c and 10d, collectively 10, for housing various components of an electrical distribution system 12 and having an arc fault detection system 13 of various components as further explained below. A power source 14, which may comprise, for example, a utility company power transformer, supplies power for the distribution system 12 through a main circuit 16. The main circuit 16 is typically routed through a main breaker, designated here by reference numeral 18. The arc fault detection system 13 may include a main current sensor 20 such as a toroidal coil provided for monitoring the main circuit 16 for characteristics of arcing faults and producing an indication signal 42 thereof, as is known in the art. A source bus 22 connected to the main circuit 16 distributes electrical power from the power source 14 to a plurality of feeder circuits 24a, 24b, 24c, each of which is routed through one of the switchgear compartments 10a-c. Each of the feeder circuits, collectively 24, typically supplies power to one or more loads (not shown) downstream of the switchgear enclosure 10. It will be appreciated that the number of feeder circuits 24 shown here, as well as the number of switchgear compartments 10, is exemplary only, and may be varied according to the particular type and/or application of the switchgear enclosure 10.

The switchgear enclosure 10 typically includes switching and monitoring equipment associated with the respective feeder circuits 24. For example, in the embodiment shown in FIG. 1, the switchgear enclosure 10 includes a plurality of circuit interrupters, here shown as feeder line circuit breakers 26a,b,c. Also included with the components of the arc fault detection system 13 are a plurality of optical sensors 28a,b,c distributed among the compartments. In one embodiment, the circuit breakers, collectively 26, and optical sensors, collectively 28, comprise devices known in the art which are mounted within the respective switchgear compartments 10a, b,c and are associated with one of the feeder circuits 24a,b,c.

Figure 2:
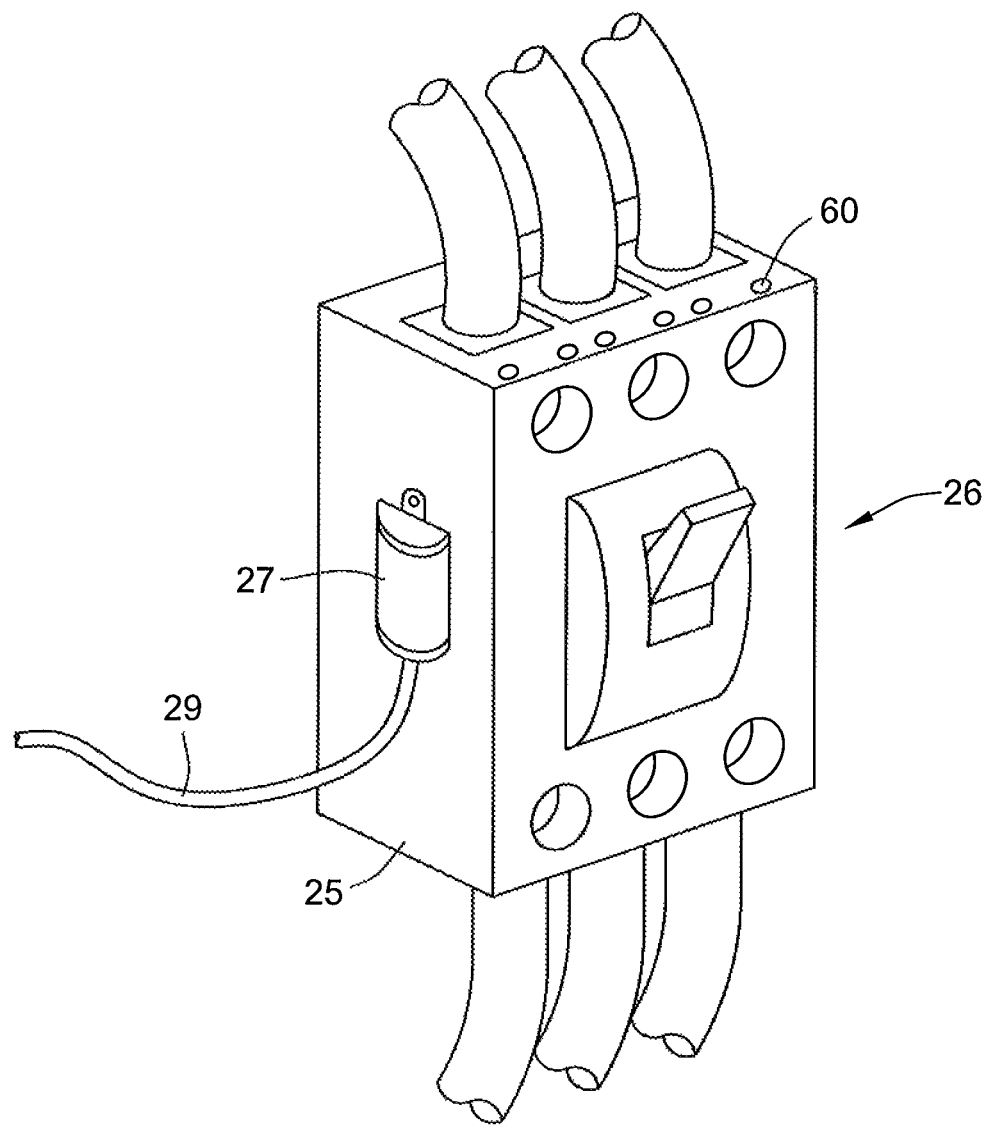
FIG. 2 is a detail view of an exemplary embodiment of one suitable transducer environment according to some aspects of the invention, here being an exterior view of a molded case circuit breaker (MCCB) and its case with a transducer attached.

For example in the detail view of FIG. 2 the circuit breaker 26 is a three phase molded case circuit breaker, provided for interrupting, i.e. breaking, electric power in the respective feeder circuits 24 in response to current overloads. Attached to the case 25 of the circuit breaker 26 is a transducer 27 used to detect a secondary effect of an overcurrent event occurring within the case 25 of the circuit breaker 26 and transmit a signal on its output line 29 from the transducer upon detection of said secondary effect to the arc fault detection system 13 of FIG. 1. As further explained below the transducer 27 may be selected from a group of transducers including a magnetic sensor; a vibration sensor; a radio frequency or near radio frequency (RF) sensor; and a thermal sensor.

Optical sensors 28 of FIG. 1 are provided for monitoring the respective feeder circuits 24 for the presence of light produced by arcing faults. Again, however, it will be appreciated that the electrical components shown here are exemplary only; they may be replaced, eliminated or supplemented with other components, according to the particular type and/or application of the switchgear enclosure.

In accordance with one aspect of the present invention, the arc fault extinguishing mechanism of FIG. 1 includes an arc diverter circuit 30 connected between the source bus 22 and ground. The arc diverter circuit 30 includes an arc diverter 32 which, upon receipt of an arcing fault detection signal 34, quickly connects the source bus 22 to ground or "crow-bars," i.e., shorts the circuits to be protected, thereby extinguishing arcing fault currents which may have occurred on any of the feeder circuits 24 before they are permitted to generate gases, to include plasmas, at dangerous pressures and/or temperatures. In one embodiment, for example, the arcing fault currents are extinguished in less than about 4 milliseconds, effectively eliminating the generation of dangerous gases associated with the arcing fault. In other aspects of the invention the main breaker 18 may function as the arc extinguishing mechanism either by itself or in conjunction with the arc diverter 32.

The current sensor 20 may comprise any type of current sensor known in the art. The optical sensors 28 may comprise any type of optical sensor known in the art such as, for example, the optical sensor described in U.S. Pat. No. 4,369,364. The optical sensors 28 are sensitive to light impulses, which may represent the occurrence of arcing faults within the switchgear enclosure 10, and produce a second arcing fault indication signal 38, the first being 42 from current sensor 20, if they determine that an arcing fault is present on any of the feeder circuits 24.

The respective arcing fault indication signals 42, 38 are fed to an arcing fault detector, such as an AND gate 40, which produces a consolidated arcing fault detection signal 34 to trigger the arc extinguisher, e.g. arc diverter 32 or main breaker 18 or both, only when arcing fault detection signals are provided by both the current sensor 20 and optical sensor 28. This arrangement is intended to minimize the chance that shut down of the entire electrical system will occur due to "false" signals because it is unlikely that false signals will be detected by both the current sensor 20 and the optical sensor 28. It will be appreciated, however, that the hot luminous gas cloud exhaust of the feeder line breaker 26 produced by opening of the contacts during an intended tripping event will often produce a flash of light exiting through the exhaust ports, collectively 60, or other parts of the case 25 of the breaker 26.

Thus, in order to avoid a false arcing fault detection signal 34 generated by AND'ing only the output 38 of the optical sensors 28 and the output 42 of the current sensor 20 and thereby triggering an arc extinguisher and shutting down the entire system, the output of the breaker-sensing transducer 27 is also fed to an inverting input 31 of the AND gate 40. Thus, only when the transducer signal is low will the arc extinguishing mechanism be allowed to operate, or conversely, when the transducer signal is high, indicating a possible trip event for the breaker, preventing the arc extinguisher from operating. It will be appreciated by those in the art that various electronic controllers may be suitably configured to act upon the filtering information in any desired manner, such as inducing delays to, or immediate activation of, one or more of the protection systems including main breaker 18.

In various aspects an exemplary transducer 27 of a single type may be applied in proximity to the case of the circuit breaker, that is on or close to selected portions of the case 25 for detecting a secondary effect of an overcurrent event occurring within the case of the feeder line circuit breaker. Alternatively, a plurality of one type or a mixture of various types of transducers may be used for transmitting a signal or signals from the transducers upon detection of a variety of secondary effects to the arc fault detection system. Without limitation the transducer may be selected from a group of transducers including a magnetic sensor; a vibration sensor; a radio frequency, or near radio frequency (RF) sensor; and a thermal sensor. It will be understood by the person having ordinary skill in the art that radio frequency is used in the general sense of higher frequency electromagnetic waves and is not intended to convey any exact range of frequencies beyond that necessary to accomplish the objectives of the present invention. The transducer in some aspects of the invention may be a magnetic sensor located on the exterior of the circuit breaker case in proximity to a current path of the circuit breaker to sense a rise in magnetic fields associated with a large rise in current through the circuit breaker. For example the magnetic sensor may be one of a reed switch, a hall effect transducer, or an inductor coil to sense a rise in magnetic field emanating through, or caused by, an overcurrent event occurring with the circuit breaker case and responsive thereto.

In other aspects the transducer may be a vibration sensor located on the exterior of the circuit breaker case preferably in proximity to a point of maximal vibration caused by the movable contact or contacts of the circuit breaker separating to open the protected circuit. For example the vibration sensor may be selected from the group including piezoelectric materials and accelerometers capable of reacting to vibrations in the breaker case caused by the separation of the contacts.

In other aspects the transducer may be an RF sensor located on the exterior of the circuit breaker case in proximity to a movable contact of the circuit breaker for sensing higher frequency electromagnetic radiation caused by arc formation on the parting contacts of the circuit breaker. For example the RF sensor may be one of a stripline or microstrip antenna. This type of antenna can be manufactured on flexible dielectric substrate with adhesive backing that can easily be applied to the surface of the circuit breaker.

In other aspects the transducer may be a thermal sensor located in proximity to an exhaust port of the circuit breaker which releases high temperature arc gases and debris to the outside of the circuit breaker case caused by the arc upon separation of the movable contact or contacts of the circuit breaker. The thermal sensor might be one of a thermocouple or Resistance Temperature Detector (RTD).

Thus a method of controlling an arc fault detection system according to the invention may include the signaling of an imminent or a present tripping event or hot luminous exhaust gas emission from a circuit breaker, comprising the steps of applying a transducer in proximity to the case of the circuit breaker, detecting a secondary effect of an overcurrent event occurring within the case of the circuit breaker with said transducer, transmitting a signal from the transducer upon detection of said secondary effect to an arc fault detection system, and receiving and processing said signal at the arc fault detection system as evidence of a possible arc event or a false indication thereof. The transducer may be selected from a group of transducers including a magnetic sensor; a vibration sensor; a radio frequency, or near radio frequency (RF) sensor; and a thermal sensor.

Upon output of the transducer signal, the step of receiving and processing said signal at the arc fault detection system may be treated as evidence of possible intended breaker operation. In some instances a step in the method of arc fault detection system control may include using the transducer signal as a filter input to eliminate falsely positive indications of an arcing event from other parts of the arc fault detection system.

Figure 3:
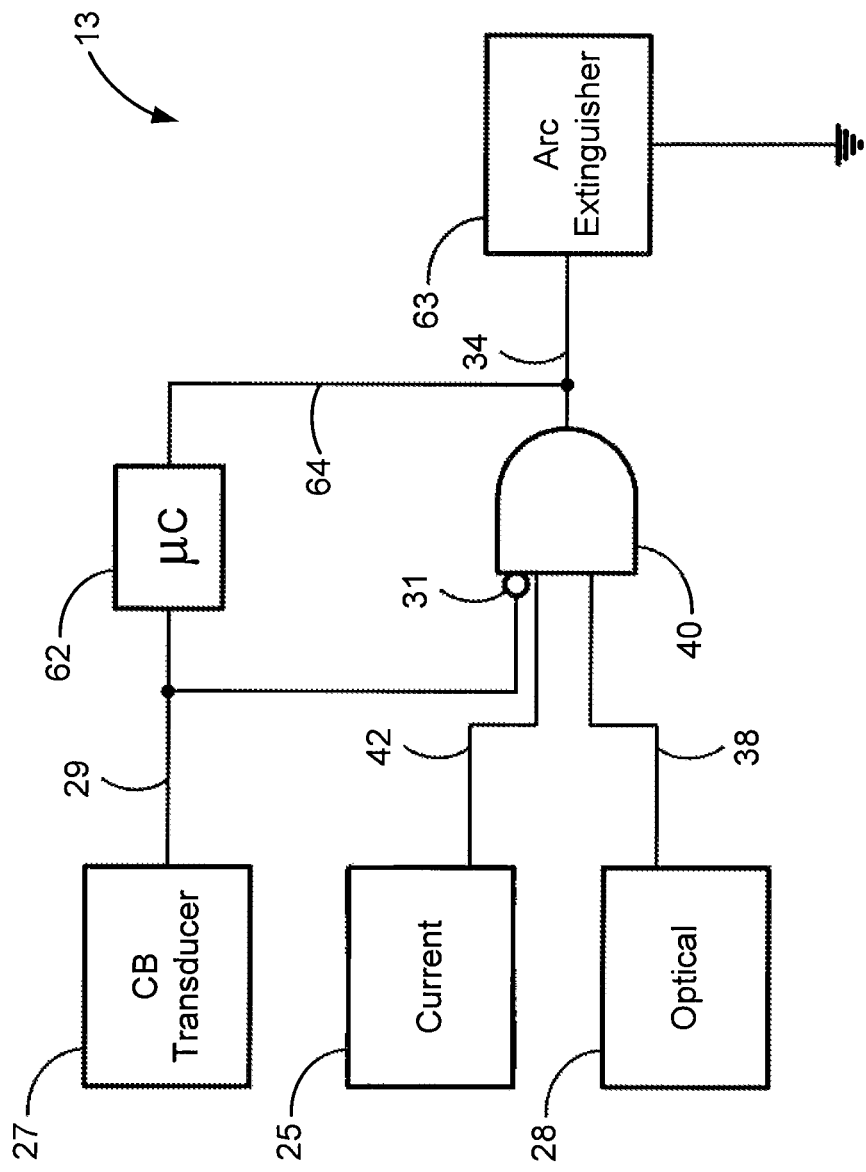
FIG. 3 is a schematic showing an aspect of the invention where a transducer may initiate action based on continuing presence of a secondary effect from the breaker.

Referencing FIG. 3, continued presence of the secondary effect following intended circuit breaker operation can be an indicator of compromised current interruption by the breaker. In such a circumstance, exceeding a given event duration can be sensed and interpreted by the arc fault detection system as a possible failure of the feeder line breaker such as by a properly programmed microcontroller 62 receiving the transducer signal 29 and appropriate action initiated to prevent an arc flash should the breaker event cascade to such an state. Appropriate protective action may involve annunciating the condition, activating the arc extinguisher 64, i.e. opening the main breaker and/or operating the arc diverter by an override signal 64 or adjusting the arc flash detection system programmed response to future sensory inputs.

Having thus described a system of control for arc management systems for electrical systems; it will be appreciated that many variations thereon will occur to the artisan upon an understanding of the present invention, which is therefore to be limited only by the appended claims.

The invention claimed is:

1. An arc fault signaling system for a circuit breaker, comprising:
   a circuit breaker,
   a transducer mounted outside of a case of the circuit breaker in proximity to the circuit breaker for detecting and signaling a secondary effect of an overcurrent event within the case of the circuit breaker, and
   an arc fault detection system for receiving and processing a transducer signal generated by the transducer, wherein the transducer signal indicates that a secondary effect of an overcurrent event within the case of the circuit breaker has been detected and prevents the arc fault detection system from performing an arc extinguishing operation.

2. A method of operating an arc fault detection system in an electrical enclosure, comprising:
   applying a transducer in proximity to a case of a circuit breaker within the enclosure,
   detecting a secondary effect of an overcurrent event within the circuit breaker with said transducer,
   transmitting a signal from the transducer to an arc fault detection system, wherein said signal indicates that a secondary effect of an overcurrent event within the case of the circuit breaker has been detected, and
   receiving and processing said signal at the arc fault detection system, wherein said signal prevents operation of an arc extinguishing mechanism of the arc fault detection system.

3. The method of claim 2 wherein said transducer is selected from the group including:
   a magnetic sensor, a vibration sensor, a radio frequency sensor, and a thermal sensor.

4. The method of claim 3 wherein the transducer is a magnetic sensor located on the exterior of the circuit breaker case in proximity to a current path within the circuit breaker.

5. The method of claim 4 wherein the magnetic sensor is selected from the group including a reed switch, a hall effect transducer, and an inductor coil.

6. The method of claim 3 wherein the transducer is a vibration sensor located on the exterior of the circuit breaker case in proximity to a movable contact of the circuit breaker.

7. The method of claim 6 wherein the vibration sensor is selected from the group including piezoelectric sensors and accelerometers.

8. The method of claim 3 wherein the transducer is a radio frequency sensor located on the exterior of the circuit breaker case.

9. The method of claim 8 wherein the radio frequency sensor is selected from the group including stripline and microstrip antennas.

10. The method of claim 3 wherein the transducer is a thermal sensor located in proximity to an arc gas exhaust port of the circuit breaker.

11. The method of claim 10 wherein the thermal sensor is selected from the group including thermocouples and Resistance Temperature Detectors (RTD).

12. The method of claim 2 wherein the step of receiving and processing said signal at the arc fault detection system includes using the signal as a filter input to eliminate falsely positive indications of an arcing event.

13. The method of claim 2 wherein there are a plurality of transducers in proximity to the circuit breaker which are selected from the group including magnetic sensor, a vibration sensor, a radio frequency sensor, and a thermal sensor.

14. The method of claim 2 wherein the step of receiving and processing said signal at the arc fault detection system includes inverting and ANDing said signal with a current sensor signal or an optical sensor signal or both.

15. A method of operating an arc fault detection system in an electrical enclosure, comprising:
   applying a transducer in proximity to a case of a circuit breaker within the enclosure,
   detecting an excessive duration of a secondary effect of an overcurrent event within the circuit breaker with said transducer,
   transmitting a signal from the transducer to an arc fault detection system, wherein said signal indicates that said excessive duration of a secondary effect of an overcurrent event has been detected, and preventing an arc extinguishing mechanism in response to said signal.

* * * * *